(12) United States Patent
Harris et al.

(10) Patent No.: US 6,391,969 B1
(45) Date of Patent: May 21, 2002

(54) POWDER SLURRY COMPOSITIONS WITH SOLID PARTICULATE CARBAMATE RESIN COMPONENT DISPERSED IN LIQUID AMINOPLAST RESIN CARRIER

(75) Inventors: Paul J. Harris, West Bloomfield; Walter H. Ohrbom, Hartland Township; John W. Rehfuss, West Bloomfield, all of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/633,513

(22) Filed: Aug. 7, 2000

Related U.S. Application Data

(62) Division of application No. 09/165,146, filed on Oct. 1, 1998, now Pat. No. 6,150,465.

(51) Int. Cl.$^7$ .................................................. C08K 5/07
(52) U.S. Cl. ....................... 525/163; 525/428; 525/443; 525/456; 525/474; 525/523
(58) Field of Search ................... 525/163, 428, 525/443, 456, 474, 523

(56) References Cited

U.S. PATENT DOCUMENTS

| | | | |
|---|---|---|---|
| 3,787,230 A | 1/1974 | Hoffman et al. | 117/102 |
| 3,925,580 A | 12/1975 | Brewer | 427/372 |
| 4,268,542 A | 5/1981 | Sakakibars et al. | |
| 4,352,858 A | 10/1982 | Stanley | 428/423.1 |
| 4,442,248 A | 4/1984 | Kanada et al. | |
| 4,528,318 A | 7/1985 | Konishi et al. | |
| 5,292,833 A | 3/1994 | Grahe et al. | 525/531 |
| 5,300,328 A | 4/1994 | Rehfuss | |
| 5,326,397 A | 7/1994 | Abdelrazig et al. | 106/808 |
| 5,336,566 A | 8/1994 | Rehfuss et al. | |
| 5,356,669 A | 10/1994 | Rehfuss et al. | |
| 5,373,069 A | 12/1994 | Rehfuss et al. | |
| 5,379,947 A | 1/1995 | Williams et al. | |
| 5,451,656 A | 9/1995 | Menovcik et al. | |
| 5,475,064 A | 12/1995 | Menovcik et al. | |
| 5,510,444 A | 4/1996 | Halpaap et al. | 528/45 |
| 5,512,639 A | 4/1996 | Rehfuss et al. | |
| 5,559,195 A | 9/1996 | McGee et al. | 525/383 |
| 5,576,063 A | 11/1996 | Briggs et al. | |
| 5,593,733 A | 1/1997 | Mayo | |
| 5,596,043 A | 1/1997 | Harris et al. | 525/127 |
| 5,605,965 A | 2/1997 | Rehfuss et al. | |
| 5,639,828 A | 6/1997 | Briggs et al. | |
| 5,659,003 A | 8/1997 | Menovcik et al. | |
| 5,723,552 A | 3/1998 | Menovcik et al. | |
| 5,726,254 A | 3/1998 | Wu et al. | |
| 5,726,274 A | 3/1998 | Menovcik et al. | |
| 5,744,550 A | 4/1998 | Menovcik et al. | 525/162 |
| 5,777,048 A | 7/1998 | Ohrbom et al. | |
| 5,989,642 A | * 11/1999 | Singer et al. | 427/407.1 |

FOREIGN PATENT DOCUMENTS

| | | | |
|---|---|---|---|
| EP | 0 516 066 A2 | 5/1992 | C08J/3/05 |
| EP | 0 636 660 A2 | 7/1994 | C08L/75/04 |
| EP | 0 661 315 A1 | 12/1994 | C08G/12/40 |
| EP | 0 767 187 A1 | 9/1996 | C08G/18/38 |
| GB | 1 358 067 | 9/1971 | C07C/125/06 |

OTHER PUBLICATIONS

Encyclopedia of Polymer Science and Engineering, vol. 13, "Poly(phenylene Ether) to Radifical Polymerization" John Wiley & Sons, pp. 245–247.
Advanced Inorganic Chemistry A Comprehensive Test, F. Albert Cotton, Geoffrey Wilkinson, pp. 28–61.
Esters of Carbamat Acid, Phillip Adams and Frank A. Baron, Jan. 4, 1985, pp. 567–602.

* cited by examiner

*Primary Examiner*—Margaret G. Moore
(74) *Attorney, Agent, or Firm*—Mary E. Golota

(57) ABSTRACT

The invention provides a powder slurry composition comprising a first solid particulate component (a) dispersed in a crosslinking component (b) having at least one crosslinking resin which is liquid at 20° C. First component (a) is in solid particulate form having an average particle size of from 3 to 30 microns. Component (a) has a compound (i) having a $T_g > 40°$ C. and at least one carbamate or urea functional group, or a group convertible to a carbamate or urea group appended thereto. Crosslinking component (b) has at least one crosslinking resin (i) which is liquid at 20° C. Most preferably, crosslinking component (b) will further include a self-crosslinking aminoplast resin (ii) having at least two aminoplast groups and at least two groups which are non-reactive with solid particulate first component (a) but which are reactive with said aminoplast groups. The powder slurry composition of the invention has a VOC of less than 1.0 lbs./gal and provides performance and application improvements over the prior art.

1 Claim, No Drawings

POWDER SLURRY COMPOSITIONS WITH SOLID PARTICULATE CARBAMATE RESIN COMPONENT DISPERSED IN LIQUID AMINOPLAST RESIN CARRIER

This application is a divisional of Ser. No. 09/165,146, now U.S. Pat. No. 6,150,465, filed Oct. 1, 1998.

FIELD OF THE INVENTION

The present invention relates to powder slurry compositions and methods of using the same. The invention provides an improved powder slurry composition utilizing a first solid particulate component (a) comprising a carbamate or urea functional compound (i) which is dispersed in a crosslinking component (b) comprising at least one crosslinking resin (i) which is liquid at 20° C. More particularly, the powder slurry compositions of the invention utilize a crosslinking component (b) further comprising a self-crosslinking aminoplast resin (ii) and most preferably, a self-crosslinking aminoplast resin (ii) having at least two aminoplast groups and at least two groups which are reactable with said aminoplast groups but which are nonreactive with the particulate film forming resin.

BACKGROUND OF THE INVENTION

Powder slurry compositions have been used to provide a variety of advantages in the coating of articles. Powder slurry compositions typically include a first component that is in a solid particulate form and a second component that is liquid. The first component is dispersed in the second component to provide a slurry which can be applied using conventional spray application equipment and techniques.

Aqueous powder slurry compositions provide the advantages of powder coating compositions with the ease of application of traditional solvent borne coatings. As a result, powder slurry compositions have the potential for environmental and financial advantages.

However, powder slurry compositions do present performance and application challenges. Traditional powder slurry compositions typically utilize epoxy acid resin systems. Such systems often sacrifice scratch and mar resistance in order to obtain acceptable water resistance, chip resistance and etch resistance. The nature of the powder coating composition used in the powder slurry composition requires that temperatures above the $T_g$ of the powder resin be used followed by temperatures sufficient to affect crosslinking. Thus, high cure schedules are often required.

Application concerns typically require the use of powder slurry compositions having lower Tg resins. The use of lower Tg resins facilitates more rapid flow and improved appearance. However, storage and manufacturing problems can result when powder slurry compositions having lower $T_g$ resins are utilized. Manufacturing is particularly challenging, especially with acid epoxy resin systems. Separation, precipitation and/or agglomeration of the solid particulate component during storage may also be observed.

Inferior film adhesion and/or cracking of the applied powder slurry film during curing are sometimes observed. These negative performance characteristics can be magnified by higher film builds and storage stability.

Finally, finished films obtained from powder slurry compositions can exhibit lower gloss and/or inferior performance characteristics, particularly when balancing scratch and mar resistance against water resistance, chip resistance and etch resistance. It is often difficult to achieve an acceptable balance of properties among these characteristics, especially with traditional acid epoxy powder/powder slurry resin systems.

Thus, it is desirable to provide improved powder slurry compositions wherein the foregoing disadvantages are either eliminated or are minimized. Prior art attempts hereto have been unsuccessful.

SUMMARY OF THE INVENTION

The present invention provides a powder slurry composition comprising a powder coating composition comprising a first solid particulate component (a) dispersed in a crosslinking component (b) that must comprise at least one crosslinking resin which is liquid at 20° C. First component (a) is in solid particulate form having an average particle size of front 0.1 to 20 microns. It comprises a compound (i) having a $T_g$>40° C. and at least one carbamate or urea functional group, or a group convertible to a carbamate or urea group appended thereto. Crosslinking component (b) comprises at least one crosslinking resin (i) which is liquid at 20° C. Most preferably, crosslinking component (b) will further comprise a self-crosslinking aminoplast resin (ii) having at least two aminoplast groups and at least two groups which are nonreactive with solid particulate first component (a) but which are reactive with said aminoplast groups. The powder slurry composition of the invention has a VOC of less than 1.0 lbs./gal and provides performance and application improvements over the prior art.

DETAILED DESCRIPTION OF THE INVENTION

The powder slurry composition of the invention requires two components, a first component (a) in solid particulate form having an average particle size of from 3 to 30 microns and a second crosslinking component (b). Second crosslinking component (b) must comprise at least one crosslinking resin (i) that is liquid at 20° C. so as to allow the dispersion of first component (a) therein.

First component (a) comprises a compound (i) having appended thereto at least one carbamate or urea functional group, or a group convertible to a carbamate or urea group. Compound (i) may be selected from the group consisting of oligomers and polymers having appended thereto more than one carbamate group or more than one urea group, or more than one group convertible to a carbamate or urea group.

Oligomers typically have a number average molecular weight of between 148 and 2000, a preferred number average molecular weight for the oligomers is between 460 and 1800 and a most preferred number average molecular weight is between 900 and 1300. Polymers typically have a number average molecular weight of between 2,000 and 20,000, with the preferred number average molecular weight for the polymers between 4000 and 6000. Mixtures of said oligomers and polymers may be used as compound (i). Number average molecular weight can be determined by the GPC method using a polystyrene standard. The carbamate or urea content of the polymer, on a number average molecular weight per equivalent of carbamate or urea functionality, will generally be between 120 and 1200, and preferably between 300 and 800.

Carbamate groups can generally be characterized by the formula:

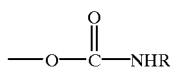

wherein R is H or alkyl, preferably of 1 to 4 carbon atoms. Preferably, R is H or methyl, and more preferably R is H. Urea groups can generally be characterized by the formula:

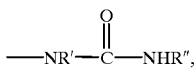

wherein R' and R" each independently represent H or alkyl, preferably of 1 to 4 carbon atoms, or R' and R" may together form a heterocyclic ring structure (e.g. where R' and R" form for example, an ethylene bridge).

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g. 60–150 psi). The temperature for this reaction is preferably 60–150° C. Useful catalysts include any that activate an oxirane ring, such as tertiary amine or quaternary salts (e.g. tetramethyl ammonium bromide), combinations of complex organotin halides and alkyl phosphonium halides (e.g., $((CH)_3SnI$, $BU_4SnI$, $Bu_4PI$, and $(CH_3)_4PI)$, potassium salts (e.g., $K2CO_3$, KI), preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Oligomeric compounds useful as compound (i), and having more than one carbamate functional group, have the general formula:

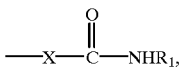

wherein X is O, or NH, $R_1$ is H or alkyl of 1 to 4 carbon atoms. The compounds useful as oligomeric compound (i) according to the invention can be prepared in a variety of ways.

The carbamate can be primary, terminating in an $NH_2$ group, or secondary, terminating in an NHR group. In a preferred embodiment, the carbamate is primary.

One way to prepare oligomeric compounds useful as compound (i) is to react an alcohol ('alcohol' is defined herein as having one or more OH groups) with urea to form a compound with carbamate groups. This reaction is accomplished by heating a mixture of the alcohol and ureas. This reaction is also performed under heat, preferably in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene or equivalent materials, and then ammonia to form a compound having primary carbamate groups, or by reaction of an alcohol with phosgene or equivalent materials and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful as compound (i) according to the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, direthyltartrate, pentaethylene glycol, dimethyl silyl dipropanol, and 2,2'-thiodiethanol.

Polymeric compounds suitable for use as compound (i) are selected from the group consisting of polyester, epoxy, alkyd, urethane, acrylic, polyamide, and polysilane polymers and mixtures thereof, wherein the polymer has more than one carbamate functional group appended thereto.

In a preferred embodiment, compound (i) comprises a carbamate functional acrylic polymer represented by the randomly repeating units according to the following formula (A):

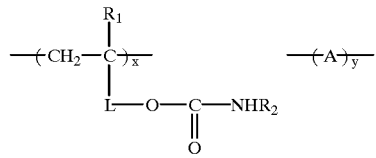

In the above formula, R represents H or $CH_3$. R' represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and preferably 20 to 50%, and y being 90 to 10% and preferably 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as α-methyl styrene, t-butyl styrene, and the like.

L represents a divalent linking group, preferably an aliphatic of 1 to 8 carbon atoms, cycloaliphatic, or aromatic linking group of 6 to 10 carbon atoms. Examples of L include the following structure (B):

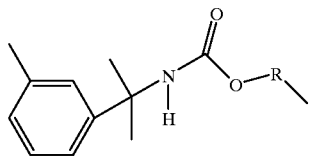

wherein R=—$CH_2$, $C_2H_4$, $C_3H_6$, $C_4H_8$, and the like.

In one preferred embodiment, —L— is represented by —COO—L'— where L' is a divalent linking group. Thus, in a preferred embodiment of the invention, polymeric compound (i) is represented by randomly repeating units according to the following formula (C):

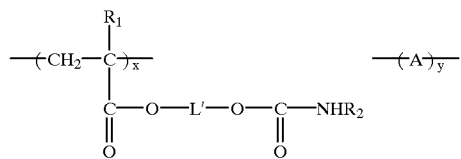

In this formula, R, R', A, x, and y are as defined above. L' may be a divalent aliphatic linking group, preferably of 1 to 8 carbon atoms, e.g., —($CH_2$)—, —($CH_2$)$_2$—, —($CH_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. This carbamate functional acrylic polymer is described in U.S. Pat. No. 5,356,669 which is hereby incorporated by reference.

The first component (i) polymer used in the composition of the invention can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an a,b-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing an acrylic polymer for use as component (i) in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or co-polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia or another primary amine in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but theoretically feasible way of preparing the polymer would be to trans-esterify an acrylate polymer with a hydroxyalkyl carbamate.

Groups capable of forming urea groups include amino groups that can be converted to urea groups by reaction with a monoisocyanate (e.g., methyl isocyanate) to form a secondary urea group or with cyanic acid (which may be formed in situ by thermal decomposition of urea) to form a primary urea group. This reaction preferably occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a urea-capped isocyanate derivative. For example, one isocyanate group on toluene diisocyanate can be reacted with hydroxyethyl ethylene urea, followed by reaction of the other isocyanate group with an excess of polyol to form a hydroxy carbamate.

Solid particulate first component (a) will typically have a $T_g$ of from 40° C. to 205° C., more preferably a $T_g$ of from 40° C. to 120° C. and most preferably a $T_g$ of from 40° C. to 80° C. Compound (i) will generally have a $T_g$ similar to those identified above for solid particulate first component (a). However, it is possible for the $T_g$ of component (i) to be higher than the above ranges. Admixture with other components of solid particulate first component (a) may lower the overall $T_g$ to within the acceptable range for solid particulate first component (a). Thus, component (i) will typically have a $T_g$ of from 40° C. to 205° C., more preferably a $T_g$ of from 40° C. to 120° C. and most preferably a $T_g$ of from 40° C. to 80° C.

Prior to incorporation into the slurry composition, solid particulate first component (a) should have an average particle size of from 0.1 to 100 microns. A preferred average particle size range for component (a) at this time, is from 3 to 60 microns. A 30 to 45 micron average particle size is most preferred. Traditional extrusion and grinding processes may be used to obtain solid particulate first component (a) within these ranges.

Component (i) may initially have an average particle size within or outside this range resulting from known powder resin manufacturing techniques. Component (i) may be up to one inch in length.

Solid particulate first component (a) upon admixture with crosslinking component (b) will typically be subsequently treated so as to reduce the above particle sizes to those more desirable for a powder slurry composition. Once in combination with crosslinking component (b), the powder slurry composition may be subjected to a particle size reduction treatment such as wet milling, microfluidization, cavitation, or other high sheer, low temperature techniques known to those skilled in the art. Thus the particle size of the powder slurry composition of the invention after a particle size reduction treatment is typically from 0.1 to 20 microns, more preferably from 0.1 to 15 microns and most preferably, will have an average particle size of from 0.1 to 12 microns.

A powder of component (i) and/or solid particulate first component (a) may be obtained according to conventional techniques and methods. The compositions of the invention are advantageous because component (i) permits the use of higher processing temperatures. Moreover, during the preparation of solid particulate first component (a), or subsequent thereto, pigments, pigment dispersions, modifiers, dispersion aids, regulators, flow modifiers, fillers, and/or additives may optionally be added as desired.

Crosslinking component (b) must contain at least one crosslinking resin (i) that is liquid at 20° C. As used herein the term "liquid" means a state of matter intermediate between a solid and a gas, shapeless and fluid, taking the shape of the container and seeking the lowest level. In addition to the at least one crosslinking resin (i), it is preferred but not required that crosslinking component (b) is a liquid at 40° C. and most preferably at 20° C. The at least one crosslinking resin (i) will have a solids content of 80% nonvolatile (NV) or more, preferably a % NV of 90 or more, and most prefereably a %NV of 95 or more. The same at least one crosslinking resin will have a viscosity less then 80P, preferably a viscosity of 40 P or less, and most preferably a viscosity of 30 P or less.

The at least one crosslinking resin (i) is a compound having a plurality of functional groups that are reactive with compound (a). Suitable reactive groups include active methylol or methylalkoxy groups on aminoplast crosslinking agents or on other compounds such as phenol/formaldehyde adducts, acrylamide groups, isocyanate groups, siloxane groups, cyclic carbonate groups, and anhydride groups.

Examples of the at least one crosslinking resin (i) which is liquid at 20° C. include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polymers having acrylamide groups, polymers having methylol or alkoxymethyl groups, polyanhydrides (e.g., polysuccinic anhydride), and polysiloxanes (e.g., trimethoxy siloxane). Monomeric and/or low oligomeric aminoplast resins such as melamine formaldehyde resins or urea formaldehyde resins are especially preferred.

Most preferably, crosslinking component (b) will further comprise a particular self crosslinking aminoplast resin (ii). Aminoplast resin (ii) will have at least two aminoplast groups and at least two groups which are reactable with said aminoplast groups and are nonreactive with solid particulate first component (a). Although not necessary to the practice of the invention, the at least one crosslinking resin (i) and self crosslinking aminoplast resin (ii) will preferably be one and the same. However, it is within the scope of the invention to have liquid crosslinking resin (i) and self crosslinking resin (ii) present as two separate components of crosslinking component (b). Self crosslinking aminoplast resin (ii) may be represented the formulas:

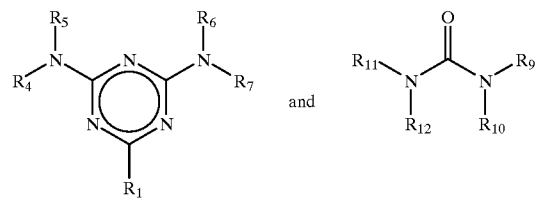

In these formulas, $R_1$ is phenyl or

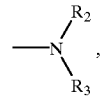

and $R_2$–$R_7$ and $R_9$–$R_{12}$ are each independently —$CH_2OR_8$ or —$CH_2$—$NR'$—$CO_2R''$, wherein $R_8$ is H, alkyl, or aryl, R' is H, alkyl, cycloaliphatic, or aryl and R" is a hydroxy substituted alkyl, hydroxy substituted cycloaliphatic or hydroxy substituted aryl, with the proviso that at least two of $R_2$, $R_3$, $R_4$, $R_5$, $R_6$, and $R_7$ are —$CH_2OR_8$ and $R_4$, $R_5$, $R_6$, and $R_7$ are —$CH_2$-$NR'$—$CO_2R''$.

It should be understood that in the context of the present invention, alkyl can include substituted alkyl, cycloaliphatic and aryl, where the substituents would not have an adverse impact on the performance of the invention. Examples of the substituents on the alkyl, cycloaliphatic, or aryl groups include ester, ether, ketones, ethylenically unsaturated groups, and tertiary amino groups. The above alkyl groups are preferably of 1–8 carbon atoms, and the above aryl group is preferably of 6–12 carbon atoms. Examples of useful alkyl groups for the above R groups include methyl, ethyl, n-propyl, n-butyl, iso-butyl, cyclohexyl, 3-chloropropyl, allyl, 2-methoxy propyl, dimethyl ethylene amine, 3-methyl-2-butanol and benzyl. Examples of useful aryl groups for $R_8$ include phenyl, naphthyl, 2-chlorophenyl, 4-chlorophenyl, 2-tolyl, and 4-tolyl.

In one preferred embodiment, the compound is an aminoplast where $R_1$ is

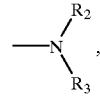

2 to 4, preferably 3 of $R_2$, $R_3$, R4, $R_5$, R6, and $R_7$ are —$CH_2OR_8$ and 4 to 2, preferably 3 of $R_2$, $R_3$, R4, $R_5$, $R_6$, and $R_7$ are —$CH_2$-$NR'$—$CO_2R''$.

Self crosslinking resin (ii) is thus an aminoplast compound modified with one or more carbamate compounds having a reactive hydroxy functionality. The carbamate may also include a linking group selected from O, Si, S, N, P and mixtures thereof. The self crosslinking aminoplast resin (ii)

may be made according to the disclosures of U.S. Pat. No. 5,379,947, hereby incorporated by reference.

The powder slurry composition of the invention is made by dispersing solid particulate component (a) in crosslinking component (b). Component (b), with the at least one liquid crosslinking resin (i), comprises the primary carrier vehicle for solid particulate first component (a).

The weight proportion of component (a) and component (b) is usually from 90:10 to 50:50, preferably from 75:25 to 60:40, in terms of solid component.

The powder slurry composition of the invention may further comprise additional optional components such as one or more solvents or additives such as pigments, fillers, catalysts, corrosion inhibitors, modifiers, dispersants, flow additives, and mixtures thereof.

Illustrative solvents include water, water soluble solvents, and organic solvents. Illustrative water-soluble solvents are alcohols. Examples of illustrative water soluble solvents and/or organic solvents are ethyleneglycol monomethylether, ethyleneglycol monoethylether, ethyleneglycol monobutylether, methanol, ethanol, isopropanol, n-butanol, sec-butanol, tert-butanol, dimethylformamide, etc. Preferred solvents are water and alcohols. Most preferred is water. Such solvents will typically be used in quantities of from 0 to 10, based on total weight of the powder slurry, and preferably from 0 to 1.0%. It is to be understood that the main liquid carrier for the solid particulate component (a) is the crosslinking component (b), rather than a solvent such as water or the like. The optional solvent is available as a minor component.

For the preparation of the powder slurry composition of the invention, the required and optional components may be combined in an optional order and mixed well by conventional processes. Component (b) may be mixed with component (a) and a pigment and, if necessary, further with other optional components. Alternatively, pigment may be mixed with component (b) to form a pigment paste, which is then admixed with a mixture of component (a) and component (b). A grinding or milling operation may follow such admixture. A preferred method of manufacture is disclosed in U.S. Pat. No. 5,379,947, hereby incorporated by reference. The powder slurry composition of the invention has advantageously low VOCs as a result of the unexpected benefits of the components of the invention.

The powder slurry composition of the invention can be applied by spray or by electrostatic deposition and are useful as both basecoat and topcoat applications. It is expected that the resultant coating compositions form smooth films with advantageous performance properties.

EXAMPLES

1. Preparation of Solid Particulate Component (a).

A solid particulate component (a) was formed from a carbamate functional acrylic resin prepared according to U.S. Pat. No. 5,474,811, hereby incorporated by reference. The resin was prepared according to a one step transcarbamation reaction with a monomer $T_g$ of 90 and an vazzo initiator level of about 6% cooked in toluene. After the reaction was approximately 90% complete, the solvent was stripped by vacuum to approximately 93–96% NV. The resulting resin having an equivalent weight of 424.3 was dropped hot onto aluminum foil and allowed to cool.

2. Preparation of Powder Slurry Compositions According to the Invention.

The solid resin of Example 1 was milled to an average particle size of 33 to 100μ in a Retsch/Brinkmann grinding mill, model ZMI.

A powder slurry composition was prepared by adding the following components in order to a mill as above. Each component was added under continuous cowles blade agitation (700–900 rpm). Agitation was continued for 15 minutes once all additions were completed.

| | |
|---|---|
| DI Water | 592.83 |
| Additive[1] | 9.27 |
| Additive[2] | 0.18 |
| Milled Resin Ex. 1 | 297.0 |
| Thickener[3] | 12.6 |
| | 911.88 |

[1]DISPERSE-AYD W-22, commercially available from Daniel Products Co. of Jersey City, N.J.
[2]Triton® X-100, commercially available from Union Carbide Chemicals and Plastics Company Inc.
[3]Acrysol RM-8, commercially available from Rohm and Haas Company.

The subsequent composition was then milled to an approximate particle size of 4.5 μm. The following were added to the milled composition: 4.56 grams of XW390, an acrylate polymer solution commercially available from Hoechst Celanese, 1.64 grams of the thickener previously added, and 50.5 grams of a methoxylated melamine having an equivalent weight of 76.1, a %NV of 98, and a viscosity of between 15–43 P. 1% of active catalyst on total resin solids (blocked PTSA) was added. All materials were added under continuous agitation. The resulting powder slurry composition was filtered through a 50 μ filter bag.

The powder slurry composition was siphon sprayed over polished steel and baked for 30 minutes at 270°.

A cured optically clear film was obtained. The cured film had a hardness of 16 Knoops and 25+ MEK rubs. The film was orange peeled with some gel agglomerates.

3. Preparation of Powder Slurry Composition According to the Invention.

The following materials were combined in a ZSK-30 extruder from Werner & Pfleiderer Corp.

| | |
|---|---|
| Solid Resin-Ex. 1 | 582 |
| Additive[4] | 9 |
| Additive[5] | 12 |

The composition was extruded at 110–110° C. at 260 RPM followed by grind milling[6] to give a solid particulate resin mixture having an average particle size of 33 to 100μ.

The powder slurry composition was then prepared by adding the following materials in order under cowles agitation.

| | |
|---|---|
| DI Water | 592.83 |
| Additive[7] | 9.27 |
| Additive[8] | 0.18 |
| Solid milled particulate resin mixture | 297.0 |
| Thickener[9] | 12.6 + 4.5 |

[4] EX505, commercially available from Troy Chemical, East Hanover, N.J.
[5]SCX-819, commercially available from SC Johnson Polymer, Racine, Wis.
[6]Retsch/Brinkmann grinding mill, model ZMI
[7]DISPERSE-AYD W-22, commercially available from Daniel Products Co. of Jersey City, N.J.

8Triton® X-100, commercially available from Union Carbide Chemicals and Plastics Company Inc.
9Acrysol RM-8, commercially available from Rohm and Haas Company.

The agitation was continued for 15 minutes following the completion of all additions. The composition was then milled[10] to obtain an average particle size of approximately 3.5μ.

46.4 grams of the melamine resin from Example 2 was then added to the composition and milling continued for one half hour. 1% of active catalyst (blocked PTSA) was added as well 1% more thickener and flow additive as per Example 2. All materials were added under continuous agitation. The resulting powder slurry composition was filtered through a 50 μm filter bag.

The powder slurry composition was siphon sprayed over polished steel and baked for 30 minutes at 270°.

A cured optically clear film was obtained. The cured film had a hardness of 16 Knoops and 25+ MEK rubs. The film was smooth with little or no agglomerates.

We claim:

1. A method of making a powder slurry composition, comprising providing a solid particulate first component (a) having an average particle size of from 0.1 to 20 microns comprising a compound (ai) having appended thereto at least one carbamate or urea functional group, or a group convertible to a carbamate or urea group, said compound (i) having a $T_g > 40°$ C., providing a crosslinking component (b) which is liquid at 20° C. and comprises at least one crosslinking resin (bi) which is liquid at 20° C., and dispersing the solid particulate first component (a) into the crosslinking component (b).

* * * * *